United States Patent
Jarske et al.

(10) Patent No.: US 7,724,885 B2
(45) Date of Patent: May 25, 2010

(54) SPATIALIZATION ARRANGEMENT FOR CONFERENCE CALL

(75) Inventors: Petri Jarske, Tampere (FI); Jussi Virolainen, Espoo (FI)

(73) Assignee: Nokia Corporation, Espoo (FI)

( * ) Notice: Subject to any disclaimer, the term of this patent is extended or adjusted under 35 U.S.C. 154(b) by 1319 days.

(21) Appl. No.: 11/179,347

(22) Filed: Jul. 11, 2005

(65) Prior Publication Data

US 2007/0025538 A1 Feb. 1, 2007

(51) Int. Cl.
*H04M 3/42* (2006.01)

(52) U.S. Cl. .................. 379/202.01; 379/158

(58) Field of Classification Search ............ 379/202.01, 379/158, 207.01, 201.01
See application file for complete search history.

(56) References Cited

U.S. PATENT DOCUMENTS

| | | | | |
|---|---|---|---|---|
| 5,271,088 | A * | 12/1993 | Bahler ...................... | 704/200 |
| 5,991,385 | A | 11/1999 | Dunn et al. | |
| 6,125,115 | A | 9/2000 | Smits | |
| 6,256,609 | B1 * | 7/2001 | Byrnes et al. ............... | 704/246 |
| 6,266,638 | B1 * | 7/2001 | Stylianou ................... | 704/266 |
| 6,327,567 | B1 | 12/2001 | Willehadson et al. | |
| 6,417,933 | B1 * | 7/2002 | Szurkowski ................ | 358/442 |
| 6,559,863 | B1 * | 5/2003 | Megiddo ..................... | 715/753 |
| 6,879,968 | B1 * | 4/2005 | Hayakawa et al. ........... | 706/20 |
| 7,177,808 | B2 * | 2/2007 | Yantorno et al. ............ | 704/246 |
| 7,305,078 | B2 * | 12/2007 | Kardos ................... | 379/202.01 |
| 7,617,094 | B2 * | 11/2009 | Aoki et al. ................. | 704/206 |
| 2005/0027528 | A1 * | 2/2005 | Yantorno et al. ............ | 704/246 |
| 2006/0133619 | A1 * | 6/2006 | Curry et al. ................... | 381/26 |

FOREIGN PATENT DOCUMENTS

| | | |
|---|---|---|
| DE | 102005004974 | 9/2005 |
| GB | 2303516 | 2/1997 |
| WO | WO 99/53673 | 10/1999 |

\* cited by examiner

*Primary Examiner*—William J Deane
(74) *Attorney, Agent, or Firm*—Alfred A. Fressola; Ware, Fressola, Van Der Sluys & Adolphson LLP

(57) ABSTRACT

A method for distinguishing speakers in a conference call of a plurality of participants, in which method speech frames of the conference call are received in a receiving unit, which speech frames include encoded speech parameters. At least one parameter of the received speech frames is examined in an audio codec of the receiving unit, and the speech frames are classified to belong to one of the participants, the classification being carried out according to differences in the examined at least one speech parameter. These functions may be carried out in a speaker identification block, which is applicable in various positions of a teleconferencing processing chain. Finally, a spatialization effect is created in a terminal reproducing the audio signal according to notified differences by placing the participants at distinct positions in an acoustical space of the audio signal.

27 Claims, 4 Drawing Sheets

US 7,724,885 B2

SPATIALIZATION ARRANGEMENT FOR CONFERENCE CALL

FIELD OF THE INVENTION

The present invention relates to teleconferencing systems, and more particularly to arranging a spatialization effect in a conference call.

BACKGROUND OF THE INVENTION

Various audio and video conferencing services have been available for a long time, particularly in circuit-switched telecommunications networks. Teleconferencing systems can be divided into distributed and centralized systems, of which the latter ones have turned out to be more advantageous in providing teleconferencing services, considering the service providers and the implementation of terminals.

FIG. 1 illustrates a prior art design for implementing a centralized audio conference service. The teleconferencing system comprises a conference bridge CB and several terminals UE that communicate with it. Each terminal UE receives the terminal user's speech by a microphone and encodes the speech signal with a speech codec known per se. The encoded speech is transmitted to the conference bridge CB, which decodes the speech signal from the received signal. The conference bridge CB combines the speech signals received from different terminals in an audio processing unit APU using a prior art processing method, after which the combined signal comprising several speech signals is encoded by a speech codec known per se and transmitted back to the terminals UE, which decode the combined speech signal from the received signal. An audible audio signal is produced from the combined speech signal by loudspeakers or headphones. To avoid harmful echo phenomena, the audio signal transmitted to the conference bridge by a terminal is typically removed from the combined audio signal to be transmitted to that terminal.

The combined signal is produced in the conference bridge typically as a single-channel (monophonic) audio signal or as a two-channel (stereophonic) audio signal. In the conference bridge, a spatial effect, known as spatialization, can be created artificially in a two-channel audio signal. In that case the audio signal is processed to give the listeners the impression that the conference call participants are at different locations in the conference room. In that case the audio signals to be reproduced on different audio channels differ from one another. When a single-channel audio signal is used, all speech signals (i.e. the combined signal) are reproduced as mixed on the same audio channel.

The spatialization, if properly implemented, improves the speech intelligibility of the conference call participants, since the listener is able sense the speech of each participant coming from a different direction. Accordingly, the spatialization is a desired feature in conference call systems. Prior art teleconferencing systems including spatialization are described e.g. in WO 99/53673, U.S. Pat. No. 6,125,115 and U.S. Pat. No. 5,991,385.

However, these prior art arrangements have remarkable disadvantages. To create a spatialization effect the receiving terminal requires information as to which participant is speaking at each moment. In most cases, the teleconference bridge is capable of defining the information, but it has to be included in the output signal of the teleconference bridge to be transmitted to each participating terminal. There is no standardized way to include this additional information in the signal to be transmitted. Besides, the inclusion of this additional information results in increase of the bandwidth used in data transmission, which is a further disadvantage.

An alternative prior known method for creating a spatialization effect is to provide a spatialization unit within the conference bridge. All input channels are spatialized in the spatialization unit and the spatialized signal is transmitted to each participating terminal. This, in turn, increases the complexity of the conference bridge. The signal including the spatialization information requires also a greater bandwidth.

Furthermore, in certain cases even the teleconference bridge is not capable of defining which participant is speaking at each moment. For example, it is possible to use the teleconference bridge as a gateway between a monophonic conference network and a 3D-capable (stereo/n-phonic) conference network. In such a situation, the gateway teleconference bridge receives, from a teleconference bridge of the monophonic conference network, a combined signal comprising all speech signals of the participants of the monophonic conference network. Again, additional information defining which participant is speaking at each moment should be included in the combined signal in order to enable the gateway teleconference bridge to separate the speakers from each other for further spatialization processing.

SUMMARY OF THE INVENTION

Now there is invented an improved method and technical equipment implementing the method, by which speaker identification can be performed upon reception without requiring any additional information to be included in the received combined signal. Various aspects of the invention include a method, a system, an electronic device and a computer program, which are characterized by what is stated in the independent claims. Various embodiments of the invention are disclosed in the dependent claims.

According to a first aspect, a method according to the invention is based on the observation that the speech parameters in the encoded speech data typically include enough information to make distinction between a few speakers involved in a typical teleconference situation. Accordingly, a first aspect of the invention includes a method for distinguishing speakers in a conference call of a plurality of participants, the method comprising: receiving speech frames of the conference call, said speech frames including encoded speech parameters; examining at least one speech parameter of the received speech frames; and classifying the speech frames to belong to one of the participants, the classification being carried out according to differences in the examined at least one speech parameter.

According to an embodiment, the method further comprises: creating a spatialization effect to an audio signal to be reproduced by placing the participants at distinct positions in an acoustical space of the audio signal based on the speech frame classification of the participants.

According to an embodiment, the method further comprises: determining a control word for each participant according to differences in the examined at least one speech parameter; and attaching control words to speech frames, the control word of each speech frame being characteristic of the participant speaking in the particular speech frame.

According to an embodiment, the method further comprises creating the spatialization effect on the basis of the control words attached to speech frames.

According to an embodiment, the method further comprises: determining the control word for each participant according to linear differences in the examined only one speech parameter; and controlling spatial positions of audio channels of the audio signal to be reproduced according to the control words.

According to an embodiment, the method further comprises: clustering the speech frames according to differences in a plurality of examined speech parameters; determining the control word for each participant according to differences in the speech parameters of the clustered speech frames; and controlling spatial positions of audio channels of the audio signal to be reproduced according to the control words.

According to an embodiment, the examined speech parameters include at least one of the following: the pitch of the voice; voiced/unvoiced classification of an encoded speech frame; or any LPC parameter of an encoded speech frame.

The arrangement according to the invention provides significant advantages. A major advantage is no speaker identification information is needed from the network in a teleconference situation, but the identification can be carried out solely in the receiving unit. Furthermore, no separate voice analysis algorithm is needed in the receiver, since the coded speech frame parameters are used for identification, which results in low computational complexity. A further advantage is that even by using a few, perhaps only one or two, suitably selected speech parameters, a distinct spatialization effect can be achieved in the terminal.

According to a second aspect, there is provided a system for distinguishing speakers in a conference call with a plurality of participants, the system comprising: means for receiving speech frames of the conference call, said speech frames including encoded speech parameters; an audio codec for examining at least one parameter of the received speech frames; and means for classifying the speech frames to belong to one of the participants, the classification being based on differences in the examined at least one speech parameter.

Such a system is applicable in various positions in the processing chain of a teleconference call. This provides a significant advantage that the certain freedom to locate the speaker identification process provides flexibility to connect mono conferencing systems to 3D conferencing systems in different stages of the conferencing network. These alternative positions are illustrated in the further aspects of the invention.

According to a third aspect, there is provided a terminal device for a three-dimensional spatialization of an audio signal of a conference call with a plurality of participants, the device comprising: means for receiving speech frames of the conference call, said speech frames including encoded speech parameters; an audio codec for examining at least one parameter of the received speech frames; means for classifying the speech frames to belong to one of the participants, the classification being based on differences in the examined at least one speech parameter; and a spatialization means for creating a spatialization effect to the audio signal to be reproduced by placing the participants at distinct positions in an acoustical space of the audio signal.

According to a fourth aspect, there is provided a computer program product, stored on a computer readable medium and executable in a data processing device, for a three-dimensional spatialization of an audio signal of a conference call with a plurality of participants, the computer program product comprising: a computer program code section for receiving speech frames of the conference call, said speech frames including encoded speech parameters; a computer program code section for examining at least one parameter of the received speech frames; a computer program code section for classifying the speech frames to belong to one of the participants, the classification being based on differences in the examined at least one speech parameter; and a computer program code section for creating a spatialization effect to the audio signal to be reproduced by placing the participants at distinct positions in an acoustical space of the audio signal.

According to a fifth aspect, there is provided a conference bridge for a teleconferencing system, the bridge comprising: means for receiving speech frames of the conference call with a plurality of participants, said speech frames including encoded speech parameters; an audio codec for examining at least one parameter of the received speech frames; means for classifying the speech frames to belong to one of the participants, the classification being based on differences in the examined at least one speech parameter; and means for including information based on the speech frame classification of the participants in an audio signal for a further spatialization processing of the audio signal.

According to a sixth aspect, there is provided a computer program product, stored on a computer readable medium and executable in a data processing device, for distinguishing speakers in a conference call with a plurality of participants, the computer program product comprising: a computer program code section for receiving speech frames of the conference call, said speech frames including encoded speech parameters; a computer program code section for examining at least one parameter of the received speech frames; a computer program code section for classifying the speech frames to belong to one of the participants, the classification being based on differences in the examined at least one speech parameter; and a computer program code section for including information based on the speech frame classification of the participants in an audio signal for a further spatialization processing of the audio signal.

According to a seventh aspect, there is provided a terminal device for operating as a master terminal connecting a plurality of slave terminals to a conference bridge, the terminal device comprising: means for receiving speech frames of the conference call with a plurality of participants, said speech frames including encoded speech parameters; an audio codec for examining at least one parameter of the received speech frames; means for classifying the speech frames to belong to one of the participants, the classification being based on differences in the examined at least one speech parameter; and means for including information based on the speech frame classification of the participants in an audio signal for a further spatialization processing of the audio signal.

LIST OF DRAWINGS

In the following, various embodiments and aspects of the invention will be described in more detail with reference to the appended drawings, in which FIG. 1 shows a centralized teleconferencing system according to prior art;

DESCRIPTION OF EMBODIMENTS

Figure 1:
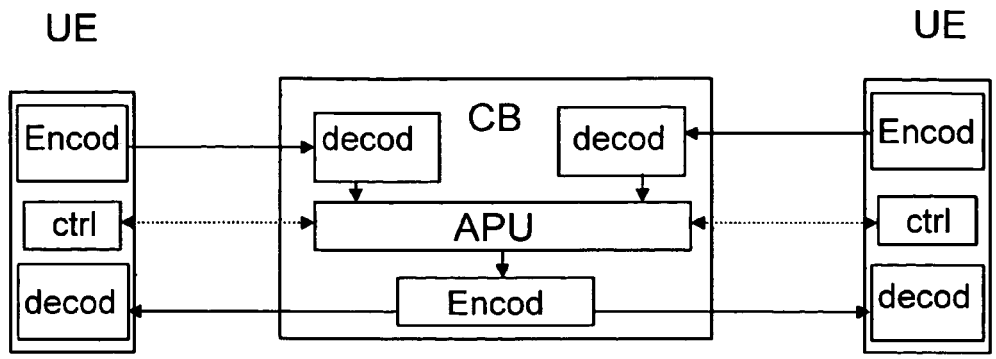

The invention is not restricted to any particular telecommunications system, but it can be used in any telecommunications system wherein the speech codecs analyse the characteristics of speech and include parameters of encoded speech in the audio signal to be transmitted to the recipients. Accordingly, the invention can utilize different audio and speech codecs, such as EFR/FR/HR speech codecs ((Enhanced) Full/Half Rate Codec) and Narrowband AMR or Wideband AMR speech codecs (Adaptive Multirate Codec) known per se from GSM/UMTS systems, and codecs used in MPEG1, MPEG2 and MPEG4 audio coding, such as an MC codec (Advanced Audio Coding), which are suitable for encoding/decoding different audio formats. The term audio codec thus refers both to audio codecs in the traditional sense and to speech codecs used in different systems and codecs with a scalable bit rate, such as CELP+AAC according to MPEG4. Hence, a skilled person appreciates that the nature of the telecommunications system is by no means restrictive for the implementation of the invention, but the invention is applicable in any circuit-switched or packet-switched telecommunications network, such as the GSM network, the GPRS network, the UMTS network, and in teleconferencing arrangements used via the Internet.

In the following, the embodiments will be described herein using the wideband AMR (AMR-WB) codec as an example. The wideband speech codec AMR-WB is further developed from the narrowband speech codec AMR-NB previously developed for the GSM system. Both the wideband and the narrowband AMR codecs are arranged to adapt the level of error concealment to radio channel and traffic conditions such that they always seek to select an optimal channel and a codec mode (speech and channel bit rates) in order to provide the best possible speech quality.

The AMR speech codec consists of a multi rate speech encoder, a source controlled rate diagram, which comprises voice activity detection (VAD) and a background noise generation system (DTX, Discontinuous Transmission) as well as an error concealment mechanism that is to prevent transmission path errors from being transmitted to a receiving party. The multirate speech codec is an integrated speech codec, whose narrowband version AMR-NB comprises eight speech codecs having bit rates of 12.2, 10.2, 7.95, 7.4, 6.7, 5.9, 5.15 and 4.75 kbit/s. The wideband speech codec AMR-WB, in turn, comprises nine speech codecs with bit rates of 23.85, 23.05, 19.85, 18.25, 15.85, 14.25, 12.65, 8.85 and 6.60 kbit/s.

The operation of the speech coding of the AMR speech codecs is based on the ACELP (Algebraic Codebook Excited Linear Prediction) method. The wideband codec AMR-WB samples speech at the frequency of 16 kHz, whereafter the pre-processed speech signal is down sampled to the operating frequency 12.8 kHz of the codec. This enables a 6.4 kHz bandwidth for a decoded speech signal, but the codec mode operating at the highest bit rate of 23.85 kbit/s also comprises speech signal post-processing functions, by means of which it is possible to determine for the speech signal a coloured random noise component in a higher frequency range (6.4 to 7 kHz) that increases the bandwidth used to 7 kHz.

The output bit stream of the speech encoder thus consists of encoded speech parameters that are typical ACELP encoder parameters. These include LPC (Linear Predictive Coding) parameters quantised in an ISP (Immitance Spectral Pair) domain, describing the spectral content and defining short-term coefficients of the filters;

LTP (Long Term Prediction) parameters describing the periodic structure of speech;

ACELP excitation describing the residual signal after linear predictors;

signal gain;

a gain parameter of extended high frequency band (only to be used in the codec of the highest bit rate).

Figure 2:
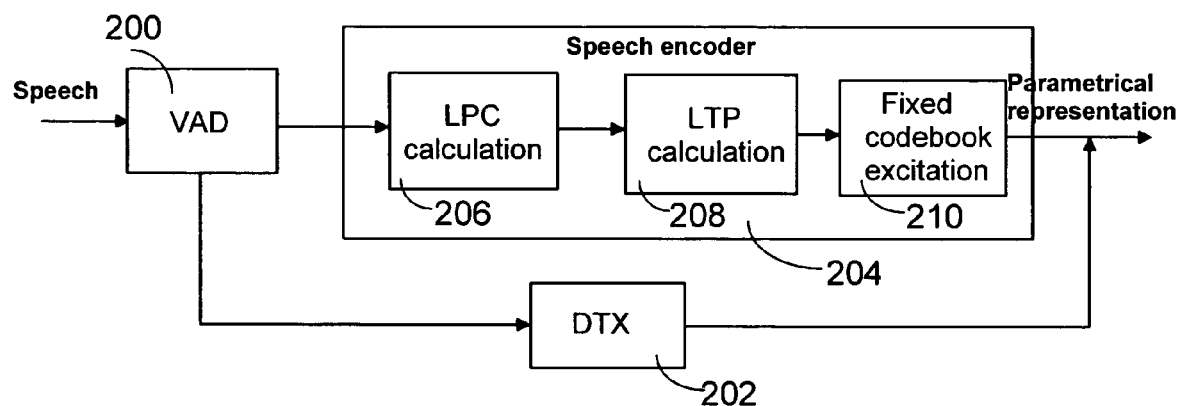
FIG. 2 shows a general functional structure of a wideband AMR speech codec.

The block diagram of FIG. 2 describes the general functional structure of a wideband speech codec AMR-WB, in which speech codec input speech is first applied to a voice activity detection block (VAD) 200. In this block, an operation is performed on the input signal by means of the VAD algorithm, in which frames that comprise speech components are separated from the frames that only comprise noise. A preliminary VAD parametrization is performed on the frames comprising speech components, whereas the frames comprising only noise will be directed to bypass the speech encoder to a discontinuous transmission (DTX) block 202, which encodes the frames comprising noise at a low bit rate (1.75 kbit/s). As a result of the preliminary VAD parametrization a pitch and energy of the speech frame can typically be determined. The speech frames comprising speech components are applied to a speech encoder 204, which comprises functionalities known per se for computing the LPC parameters (block 206), the LTP parameters (block 208) and parameters depicting signal gain (block 210).

The speech codec feeds the encoded speech parameters to a channel coder, in which successive operations, such as bit reorganisation, calculation of a CRC (Cyclic Redundancy Check) value for some of the bits, convolution coding and puncturing, are performed. These channel coded speech parameters are transmitted via a transmitter to a codec of a receiving terminal, wherein a decoder decodes the channel coding and decodes the speech parameters thus forming an audio signal to be reproduced in a receiver.

Now let us suppose that the wideband AMR-WB speech codec of FIG. 2 is used in a teleconference bridge of FIG. 1, i.e. the audio processing unit APU combines and processes the speech signals received from different terminals, and the combined signal comprising several speech signals is encoded by the wideband AMR-WB speech codec and transmitted either back to the terminals or the another conference bridge.

The embodiments of the invention are based on the observation that the speech parameters in the encoded speech data typically include enough information to make distinction between a few speakers involved in a typical teleconference situation. Accordingly, the speech codec of the receiving unit, e.g. a terminal or a gateway teleconference bridge, is arranged to examine a set of speech parameters, i.e. one or more parameters, and separate the speakers from each other according to the differences in the examined speech parameters. Then the speakers are identified from the subsequent speech frames according to the characteristic values of the examined speech parameters, after which the information of the identified speakers can be further used in creating a spatialization effect to the audio signal to be reproduced.

Figure 3:
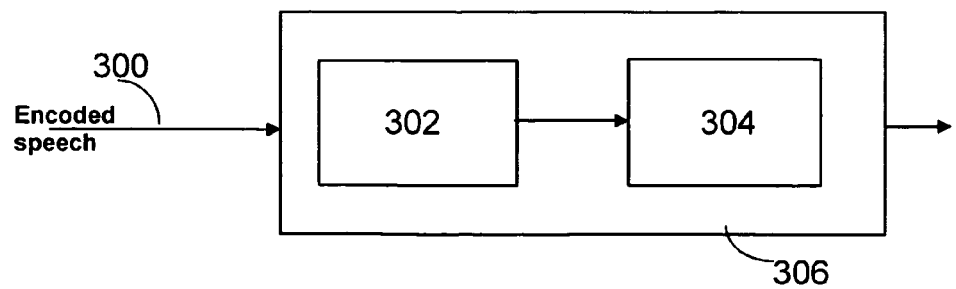
FIG. 3 shows a speaker identification system according to an embodiment of the invention in a reduced block chart.

The embodiments are further illustrated by referring to a block diagram of FIG. 3, which shows an implementation of a speaker identification block on a general level. FIG. 3 shows only functionalities relating to processing of encoded speech frames. It is apparent to a skilled person that various operations, known as such, are carried out to the received signal before encoded speech frames are inserted to the speech codec. These operations, being system-dependent at least to some extent and including typically e.g. de-interleaving and convolution decoding of the received frames, are however not relevant for the implementation of the embodiments.

A receiving unit, e.g. a terminal or a gateway teleconference bridge, receives encoded speech frames 300 including various speech parameters. From at least some of the received speech frames, one or more predefined speech parameters are copied by an extracting block 302. In practice, it is not necessary to examine each speech frame, and a viable solution can be achieved, if e.g. every second or every third speech frame is examined. The speech parameters are further fed to a recognition block 304, wherein the speakers are separated from each other according to the differences in the speech parameters and then each frame will be classified to belong to one of the speakers. The recognition block 304 further calculates a control word, which identifies the speaker and which will be further used in the creation of the spatialization effect for the particular speech frame. Accordingly, the basic implementation of the speaker identification block 306 includes the extracting block 302 and the recognition block 304. Such a speaker identification block is applicable in various audio conferencing architectures and in various positions in the processing chain of a teleconference call.

Figure 4:
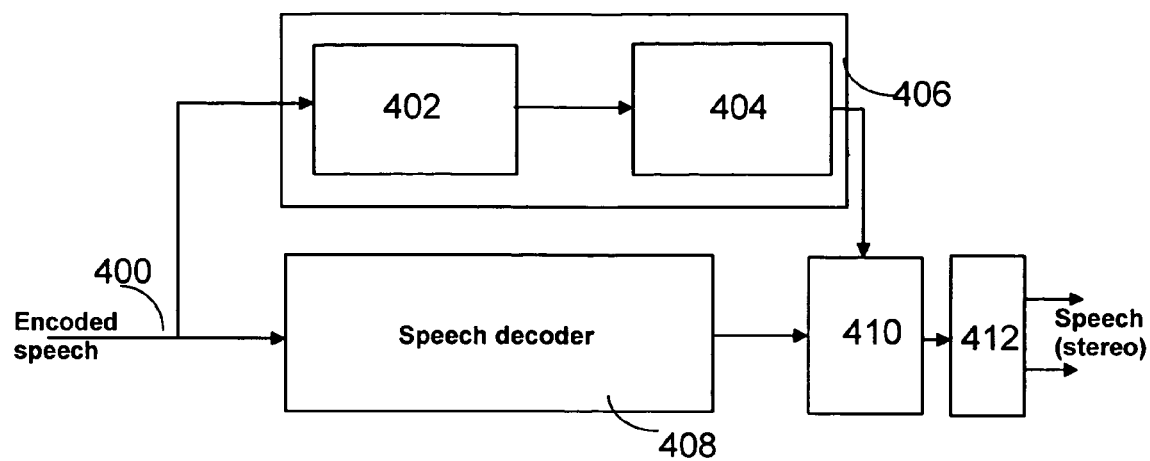
FIG. 4 shows a speaker identification system implemented in a terminal or a conference bridge according to an embodiment of the invention.

According to an embodiment, the speaker identification block can be implemented in a receiving terminal, whereby no speaker identification information is needed from the network in order to create a spatialization effect to the audio signal to be reproduced. FIG. 4 illustrates the implementation in a terminal more in detail. The terminal receives encoded speech frames 400 from a conference bridge. The extracting block 402 copies predefined speech parameters from the received speech frames, which speech parameters are input in the recognition block 404. The recognition block 404 examines the differences in the speech parameters, separates the speakers from each other accordingly, and identifies each frame to belong to one of the speakers. Then the recognition block 404 determines control words for each recognised speaker, which control words are further used in the creation of the spatialization effect for the speech frames.

Meanwhile, the encoded speech frames 400 received by the terminal are inserted in a standard speech decoder 408, e.g. an AMR-WB speech codec, for a decoding process. The output of the speech decoder 408 comprises decoded speech frames, which are inserted in a spatialization processing module 410 for the creation of the spatialization effect. In the spatialization processing module 410, each speech frame is tagged with the corresponding control word calculated by the speaker identification block 406. Each section of speech is processed according to the control words tagged with the speech frames such that each speaker is heard from a distinct place in the acoustical space sensed by a listener. This gives the sensation of each opponent speaking from different location. The playback means 412 may comprise a stereo reproduction means, e.g. headphones or stereo loudspeakers, or any other multi-channel audio system, such as a 5.1 system.

It is generally known that spatialization can be performed e.g. as HRTF (Head Related Transfer Function) filtering, which produces binaural signals for the listener's left and right ear. Artificial room effect (e.g. early reflections or late reverb) can be added to the spatialized signals to improve source externalization and naturalness. Spatialization can also be performed only by modifying the time differences (Interaural Time Difference) or the amplitude differences (Interaural Amplitude Difference) between the signals. The human auditory system converts even a small amplitude difference into a spatial difference. When headphones are used, the signals arriving from the filters can be reproduced as such for the left and the right ear, which gives the listener the impression of spatial difference. When loudspeakers are used, the listener hears both channels with both ears and thus cross-talk cancellation may be needed. Accordingly, the cross-talk cancellation can be performed as a part of the playback processing.

Like the AMR-WB codec, most speech codecs utilise linear predictive coding (LPC) in the encoding process. They also estimate the pitch of the voice, as well as whether the sound is voiced or unvoiced. The pitch and LPC parameters are somewhat characteristic to each speaker, and are therefore prominent variables for recognising the speaker. Naturally, different speech codecs require specific implementation, depending on the parameters used in speech encoding.

According to an embodiment, a very simple implementation of the speaker identification block 306 can be achieved by using only one speech parameter, such as pitch, in the identification of the speech frames. Accordingly, the extracting block 302 copies the selected parameter (e.g. pitch) from the received speech frames and inserts the parameter to the recognition block 304. The recognition block 304 maps the parameter linearly into a control word, and the linearly created control word can be used in the creation of the spatialization effect. For instance, if the speaker identification block is implemented in a terminal according to FIG. 4, the spatialization processing module 410 uses the control word directly for controlling left/right panning of the stereo output. The complexity of this embodiment is very low and experiments show that even by using only one suitably selected speech parameter a distinct spatialization effect can be achieved.

Naturally, a more remarkable spatialization effect can be achieved, if several or all of the speech parameters of the encoded speech frames are used in the identification. Thus according to another embodiment, the extracting block 302 copies a plurality of predefined parameters from the received speech frames and inserts the parameters to the recognition block 304. The recognition block 304 performs a clustering of the speech frames according to the characteristic values of the examined speech parameters and identifies to which cluster (i.e. speaker) each speech frame belongs. The recognition block 304 then calculates control words characterising each speaker (i.e. a cluster of speech frames). Again, e.g. in a terminal implementation of the speaker identification block, each speech frame is tagged with the respective control word in the spatialization processing module 410. Then each speaker is placed in a distinct place in the acoustical space. The complexity of the implementation increases to some extent when compared to the embodiment described above, but reliability of the speaker identification for each speech frame is respectively higher.

According to a further embodiment, a rather simple implementation but an enhanced spatialization effect is achieved if, in addition to the pitch value, also the partition to voiced/ unvoiced speech frames is utilised in the classification of the speech frames. Therein, the pitch information of a speech frame can be processed according to the voiced/unvoiced information of the same frame, for example, such that the pitch information is further processed only when the sound of the speech frame is clearly voiced. If the sound of the speech frame is unvoiced, the pitch information is used as such in the speaker identification. Since the usage of voiced/unvoiced sounds is typically characteristic to each speaker, it provides extra information, which facilitates distinguishing speakers from each other.

Nonetheless, a skilled person appreciates that the accuracy of the identification is not very critical in this kind of application. The identification does not affect to the reproduction of the speech items as such, but only to the spatialization effect related thereto. Thus, a false identification of a speaker of certain speech items results in placing the speaker in a wrong place in the acoustical space, which may cause some confusion, but the message is still reproduced correctly.

According to an embodiment, the speaker identification information provided by the speaker identification block can be further utilized in the receiving terminals such that the speaker identification (e.g. "Speaker 1") is displayed on the display screen of the terminal concurrently with the playback of the speech frames of the respective speaker. The visual information of the current speaker deepens the sensation of the spatialization effect.

The advantages provided by the various embodiments described above are apparent to a skilled person. A major advantage is no speaker identification information is needed from the network in a teleconference situation, but the identification can be carried out solely in the receiving terminal. Furthermore, no separate voice analysis algorithm is needed in the receiver, since the coded speech frame parameters are used for identification, which results in low computational complexity. A further advantage is that even by using few, perhaps only one or two, suitably selected speech parameters a distinct spatialization effect can be achieved in the terminal.

However, the above-described speaker identification block is applicable in various positions of different teleconferencing architectures. Consequently, a further aspect of the invention discloses a teleconference bridge including a speaker identification block according to the invention. Such a teleconference bridge typically operates as a gateway by connecting a traditional mono conferencing network to a 3D conferencing network. The term "3D conferencing network" used herein refers to a solution, wherein either the terminal is able to receive stereo/multi-channel coded speech stream from the conference bridge or some additional information can be sent to the terminal parallel with the monophonic speech channel for the creation of the spatialization effect.

The implementation illustrated in FIG. 4 can also be applied in a teleconference bridge, naturally without the playback means 412. Consequently, in an embodiment of a teleconference bridge implementation the teleconference bridge receives a combined signal from a monophonic teleconferencing network, said combined signal comprising encoded speech frames 400 from a plurality of conference call participants. The speaker identification block 406 operates as described in the terminal implementation above: the extracting block 402 inputs predefined speech parameters from each of the received speech frame in the recognition block 404, and the recognition block 404 classifies each frame to belong to one of the speakers according to the differences in the speech parameters, after which control words are defined for each recognised speaker. The encoded speech frames 400 of the combined signal are inserted in a speech decoder 408 of the teleconference bridge for a decoding process. The decoded speech frames are inserted in a spatialization audio processing module 410, wherein each speech frame is tagged with the corresponding control word calculated by the speaker identification block 406. Thus, the 3D processing for the combined signal coming from the monophonic teleconferencing network is performed in the teleconference bridge, whereby the spatial positions are controlled according to detected identities of speakers, and the processed stereo signal is first encoded and then sent to those participants that are capable for 3D reproduction. Accordingly, in this embodiment the playback means 412 are implemented in the receiving terminals. Respectively, signals coming from the terminals of the 3D conferencing network are mixed in the teleconference bridge to form a combined monophonic signal, which is then sent to the conference call participants capable to receive only monophonic audio signals.

Figure 5:
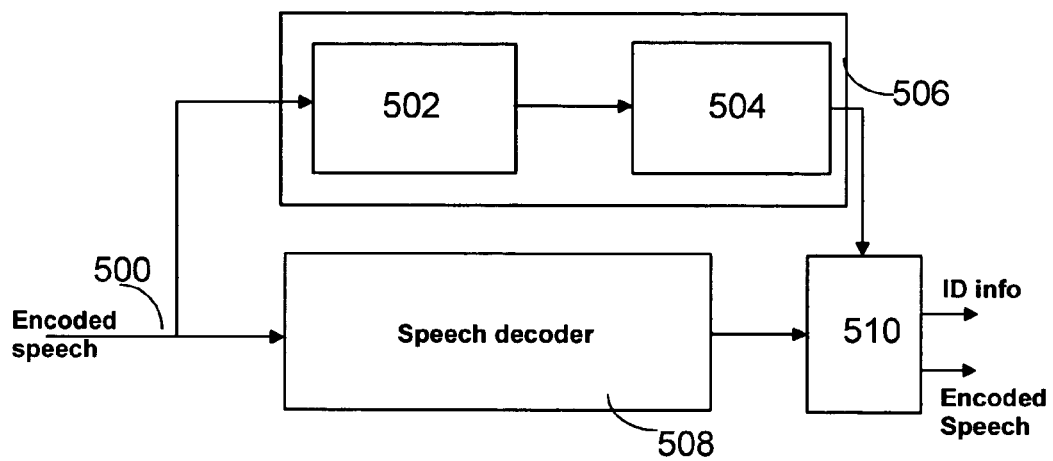
FIG. 5 shows a speaker identification system implemented in a conference bridge according to a further embodiment of the invention.

FIG. 5 illustrates another embodiment of a teleconference bridge implementation. In this embodiment, the early stages of the process are similar to the early stages of the above-described embodiment: the speaker identification block 506 recognizes the speakers and defines control words for each speaker; meanwhile the encoded speech frames 500 of the combined signal are decoded in the speech decoder 508 of the teleconference bridge. In the present embodiment, instead of creating the spatialization effect directly into the output signal of the conference bridge, only ID tags are attached to a monophonic mixed signal to be transmitted to the terminals. Accordingly, the processing module 510 attaches an additional control stream in parallel with the speech stream to be first encoded and then transmitted to the terminals. The processing module 510 can be the above-described spatialization audio processing module, which is arranged to attach the control words into the decoded speech frames as additional information, or the processing module 510 can be dedicated to this specific process. Naturally, in this embodiment the terminals take care of creating the spatialization effect in the playback phase, whereby speech sections are processed according to the ID tags of the additional control stream received in parallel with the speech stream from the conference bridge.

There are various alternatives to include the ID tag information into the monophonic mixed signal to be transmitted to the terminals. For example, the ID tags could be embedded in the speech signal. Alternatively, the redundancy of the speech signal can be utilized such that a bit-stealing technique can be used, i.e. some redundant bits in the bit stream of the speech frames are used for indicating the ID tags. A further option is to utilize the transport protocol used for transmitting the mixed signal to the terminals. A typical transport protocol used in conference calls is the RTP (Realtime Transport Protocol), where unused control fields of the RTP could be used for signalling the ID information of the active speaker to the receiver. Naturally, a separate control stream, like RTCP (Realtime Transport Control Protocol), could be used along with the transport protocol for the dedicated use of signalling the ID tags.

Figure 6:
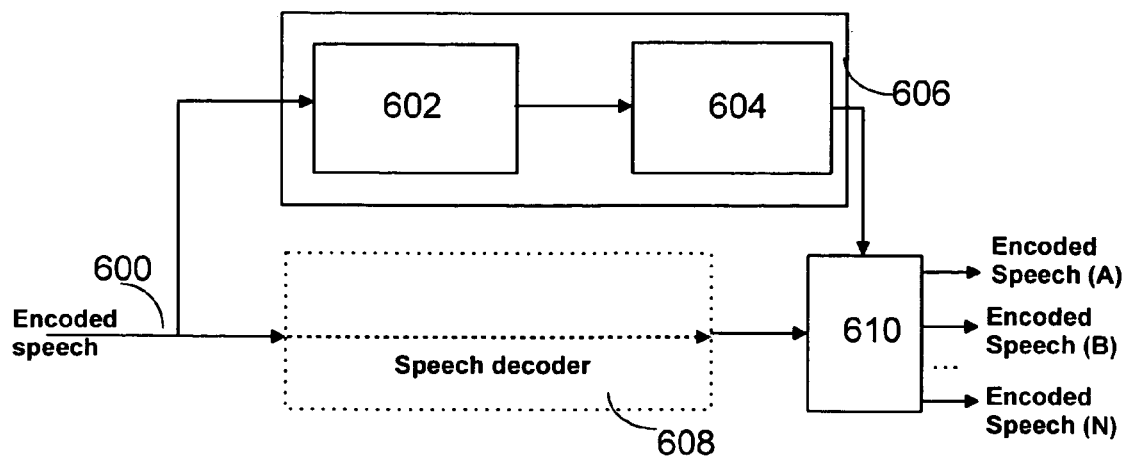
FIG. 6 shows a speaker identification system implemented in a conference bridge of a distributed teleconferencing system according to a further embodiment of the invention.

FIG. 6 illustrates a further embodiment of a teleconference bridge implementation for a distributed teleconferencing architecture. Again, the speakers are recognized and control words are defined for each speaker in the speaker identification block 606 as described above. However, for the distributed teleconferencing system the conference bridge creates separate output signals, each of them representing speech of one participant of the conference call. Accordingly, if the speaker identification block 606 detects that the participant A is speaking in a particular speech frame 600 of the monophonic mixed signal, the demultiplexer 610 controls the speech frame to be associated in the stream of the participant A, and for the duration of that particular frame silent frames or comfort noise frames are generated for the streams of rest of the participants. Then, if the speaker identification block 606 detects, for example, that the participant B is speaking in the next incoming speech frame, the speech frame is associated in the stream of the participant B, and frame silent frames are generated for the rest of the streams. All these (segregated) N speech signals are then sent to the terminals comprising means for spatializing them to different positions in the playback phase.

It is notified that in this embodiment the transcoding performed by the speech decoder 608 can preferably be bypassed, since the encoded speech frames 600 can be directly forwarded to different streams. Of course, it is possible to decode the speech frames and then direct the resulting PCM (Pulse Code Modulated) signals to different streams, which are then encoded before transmitting them to the terminals.

Figure 7A:
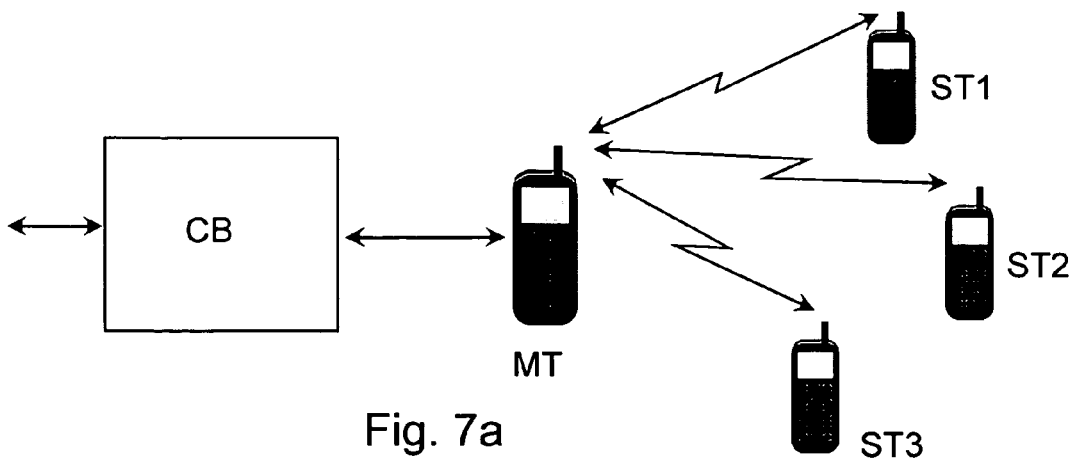
FIG. 7a shows a teleconferencing situation, wherein a group of terminals are connected to a conference bridge via a master terminal.

FIG. 7a illustrates a yet further embodiment in a teleconferencing situation, wherein a group of slave terminals (ST1-ST3) participating in a conference call are connected to the conference bridge (CB) via a master terminal (MT). For example, a plurality of the conference call participants may be gathered in a room, wherein a terminal of one participant operates as the master terminal, which is connected to the conference bridge, and the other terminals are connected to the master terminal, for example, via a Bluetooth connection or a WLAN connection. Embodiments applicable in this teleconferencing situation are variants of the embodiments described above.

Figure 7B:
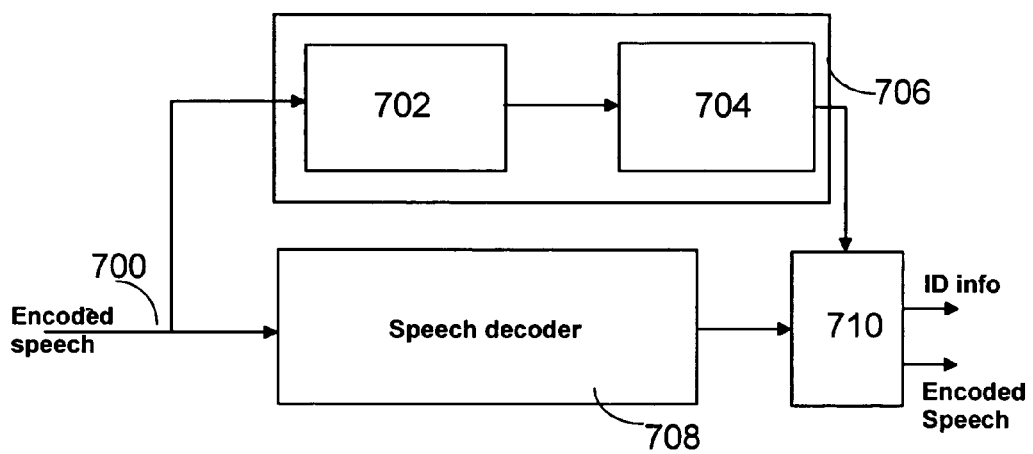
FIG. 7b shows a speaker identification system implemented in a master terminal of FIG. 7a according to an embodiment of the invention.

According to an embodiment illustrated in FIG. 7b, the master terminal receives a combined signal 700 from a conference bridge, and the speaker identification block 706 of the master terminal recognizes the speakers and defines control words for each speaker. Concurrently, the encoded speech frames 700 of the combined signal are decoded in the speech decoder 708 of the master terminal. In this embodiment, ID tags are attached to a monophonic mixed signal to be transmitted to the slave terminals. Accordingly, the processing module 710 attaches an additional control stream in parallel with the speech stream to be transmitted commonly to the slave terminals. Then the slave terminals create the spatialization effect in the playback phase, whereby speech sections are processed according to the attached ID tags.

Figure 7C:
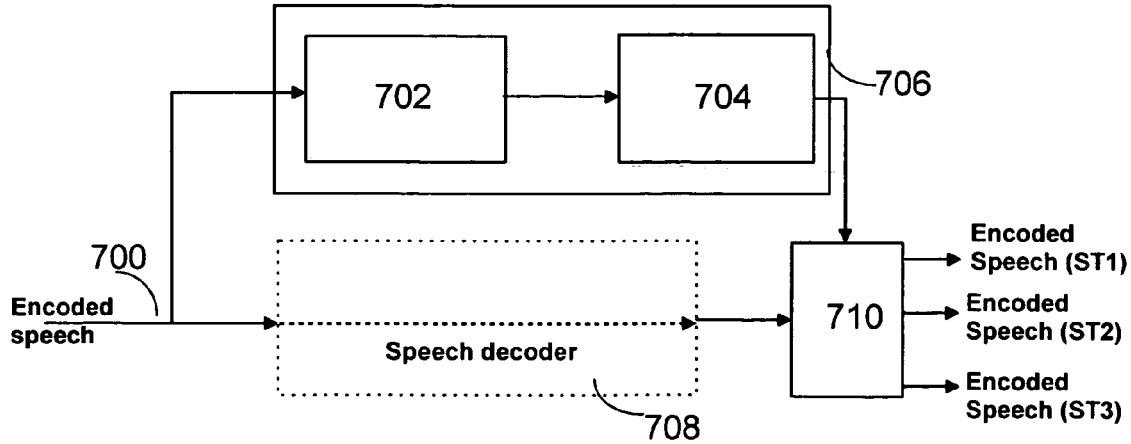
FIG. 7c shows a speaker identification system implemented in a master terminal of FIG. 7a according to another embodiment of the invention.

According to another embodiment illustrated in FIG. 7c, the master terminal operates towards to the slave terminals according to the principles of the distributed teleconferencing architecture. Consequently, the master terminal creates separate output signals representing speech of the participants of the conference call. The segregated speech signals are sent to the slave terminals, which create the spatialization effect in the playback phase. Again, the encoded speech frames 700 can be directly forwarded to different streams without any transcoding performed by the speech decoder 708.

The advantages provided by the fact that the speaker identification block is applicable in various positions in the processing chain of a teleconference call are significant. A major advantage is that the certain freedom to locate the speaker identification process provides flexibility to connect mono conferencing systems to 3D conferencing systems in different stages of the conferencing network. Furthermore, in the embodiments wherein the speaker identification block is implemented in the conference bridge, the requirement of a simple implementation of the speaker identification process is not so critical. Accordingly, if the speaker identification block is implemented in a conference bridge (a server), a high performance ID detection process requiring greater processing power and memory consumption could be used.

Figure 8:
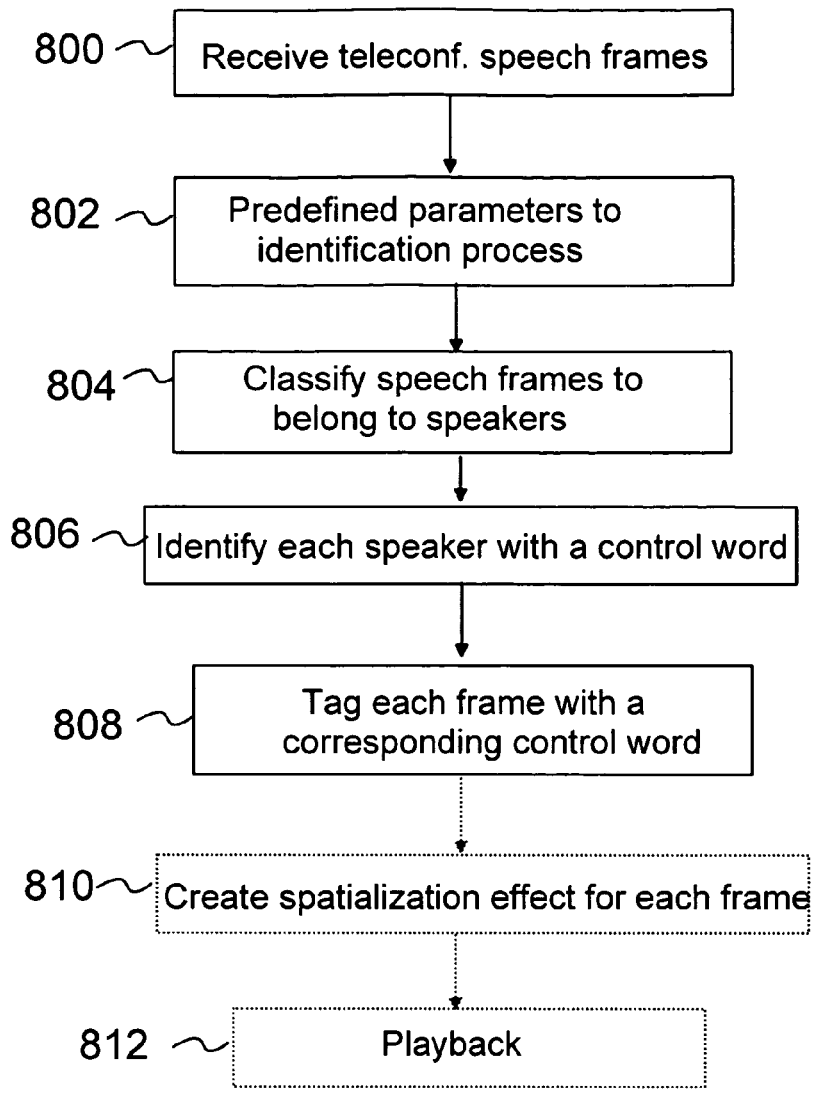
FIG. 8 shows a flow chart of a spatialization method according to an embodiment of the invention.

FIG. 8 shows a flow chart of a spatialization method according to an embodiment of the invention. In step 800, encoded speech frames including encoded speech parameters of a teleconference call are received in a receiving unit. The receiving unit includes predefined settings to use certain speech parameters in the speaker identification.

Accordingly, said predefined speech parameters of the encoded speech frames are input to an identification process (802). The differences in the selected speech parameters are the driving factor, according to which each frame is classified to belong to one of the speakers (804). Then each speaker is identified with a control word (806), which may be simply a speaker number or, if more sophisticated calculation is applied, e.g. coordinate parameters of the sound source position relatively to the listener (Cartesian: x, y, z or spherical: azimuth, elevation and distance) or a panning or a gain parameter to control spatial positions of the audio channels. Thereafter, the speech frames, which have been meanwhile decoded with a standard speech decoder, are tagged with the corresponding control word calculated in the identification process (808). Alternatively, if the distributed architecture is used as explained above, the decoding is preferably bypassed and the encoded speech frames are further handled according to their respective control words.

The above steps are related to the speaker identification and are typically performed in the receiving unit (i.e. a conference bridge, a terminal, a master terminal). The following steps are also included in the processing chain for creating the spatialization effect, but depending on the used conference call architecture and the implementation and the position of the speaker identification block in said architecture, the step of creating the spatialization effect (810) for each speech frame according to the control words tagged with the corresponding speech frame may be carried out in various positions of the processing chain, as explained above. Therefore the last steps are illustrated with a dashed line. Finally, the playback (812) is always carried out in the receiving terminal via an audio reproduction means such that each speaker is heard from a distinct place in the acoustical space sensed by a listener.

Figure 9:
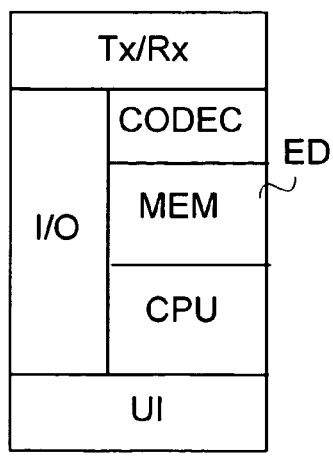
FIG. 9 shows a terminal device according to an embodiment of the invention in a reduced block chart.

The spatialization system and method described above can be implemented in any terminal capable of participating in a conference call and comprising a suitable speech decoder and an audio reproduction means. FIG. 9 shows a general block diagram of a terminal, i.e. an electronic device (ED), to which the invention can be applied. The electronic device may be, for instance, a wireless mobile station or a PDA (Personal Digital Assistant) device, a wired telephone or a computer.

The electronic device (ED) comprises a central processing unit (CPU), memory (MEM) and an I/O system (I/O). All required information is stored in the memory (MEM) of the device. The memory (MEM) comprises a read-only memory portion that can be ROM memory, for example, and a write memory portion that can be formed of RAM (Random Access Memory) and/or FLASH memory, for example. Via the I/O system (I/O), the device communicates with, for example, other devices, the network and the user. In particular, the I/O system comprises a transceiver Tx/Rx arranged to transmit and receive conference call data according to the used telecommunications protocol. Along with the transceiver Tx/Rx, there is at least one speech codec (CODEC) comprising the functions of a speech decoder and a speech encoder. As described above, the speaker identification block according to the invention is preferably implemented in connection with the codec. A user interface (UI), which is part of the I/O system (I/O), comprises a required interface for communicating with the user, such as a display, keys, and an audio reproduction means, like loudspeakers, and/or a microphone. The information received from different components of the device is transmitted to the central processing unit (CPU), which comprises one or more processors and processes the received information in a desired manner.

Figure 10:
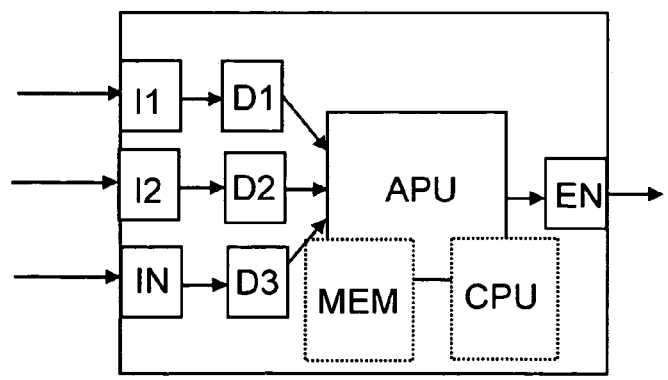
FIG. 10 shows a conference bridge according to an embodiment of the invention in a reduced block chart.

The conference bridge CB may be a PC-based server computer known as such. Accordingly, the conference bridge comprises, as illustrated in FIG. 10, which comprises inputs (I1, . . . , IN) for receiving audio signals arriving from several terminals and/or another conferencing network, and typically a plurality of decoders (D1, . . . , DN) for decoding the input signals. The audio signals of the inputs are supplied to an audio processing unit APU, where the audio signals are combined in a desired manner, which may comprise signal mixing, spatialization, filtering or other desired processing methods, as a result of which either a monophonic or a stereophonic (or a multichannel) combined output audio signal is produced. The speaker identification block according to the invention is implemented as a part of the APU. The conference bridge further comprises memory MEM and one or more central processing units CPU comprising at least one processor, whereby the functions of the audio processing unit APU may be implemented by utilizing the common memory components and processing units of the conference bridge, or the audio processing unit APU may be implemented as a dedicated unit. Furthermore, the conference bridge comprises one or more speech encoders (EN) for encoding the output signal of the bridge.

The steps according to the embodiments can be largely implemented with program commands executed in the central processing unit of the terminal of FIG. 9 or in the conference bridge of FIG. 10. Thus, said means for carrying out the method described above are typically implemented as computer software code. The computer software may be stored into any memory means, such as the hard disk of a PC or a CD-ROM disc, from where it can be loaded into the memory of a terminal. The computer software can also be loaded through a network, for instance using a TCP/IP protocol stack. It is also possible to use hardware solutions or a combination of hardware and software solutions for implementing the inventive means.

It is obvious that the present invention is not limited solely to the above-presented embodiments, but it can be modified within the scope of the appended claims.

What is claimed is:

1. A method comprising:
   receiving speech frames of a conference call, said speech frames including encoded speech parameters;
   examining at least one speech parameter of the received speech frames;
   classifying the speech frames to belong to one of a plurality of participants in said conference call, the classification being carried out according to differences in the examined at least one speech parameter;
   determining a control word for each participant according to differences in the examined at least one speech parameter; and
   attaching control words to speech frames, the control word of each speech frame being characteristic to the participant speaking in the particular speech frame.

2. The method according to claim 1, the method further comprising:
   creating a spatialization effect to an audio signal to be reproduced by placing the participants at distinct positions in an acoustical space of the audio signal based on the speech frame classification of the participants.

3. The method according to claim 1, the method further comprising:
   creating a spatialization effect on the basis of the control words attached to speech frames.

4. The method according to claim 3, the method further comprising:
   determining the control word for each participant according to differences in the examined only one speech parameter; and
   controlling spatial positions of audio channels of the audio signal to be reproduced according to the control words.

5. The method according to claim 3, the method further comprising:
   clustering the speech frames according to differences in a plurality of examined speech parameters;
   determining the control word for each participant according to differences in the speech parameters of the clustered speech frames; and
   controlling spatial positions of audio channels of the audio signal to be reproduced according to the control words.

6. The method according to claim 1, wherein the examined speech parameters include at least one of the following:
   the pitch of the voice;
   a voicing classification of a speech frame;
   any LPC parameter of a speech frame.

7. A system comprising:
   a receiving unit configured to receive speech frames of a conference call, said speech frames including encoded speech parameters;
   a decoder configured to examine at least one parameter of the received speech frames;
   a recognition block configured to classify the speech frames to belong to one of a plurality of participants in said conference call, the classification being based on differences in the examined at least one speech parameter and to determine a control word for each participant according to differences in the examined at least one speech parameter; and
   a spatialization processing module configured to attach control words to speech frames, the control word of each speech frame being characteristic to the participant speaking in the particular speech frame.

8. The system according to claim 7, wherein
   the spatialization processing module is configured to create a spatialization effect to the audio signal to be reproduced by placing the participants at distinct positions in an acoustical space of the audio signal.

9. The system according to claim 8, wherein
   the spatialization processing module is further configured to create the spatialization effect on the basis of control words attached to speech frames by said spatialization processing module, wherein said control words are configured to be determined by said recognition block.

10. The system according to claim 9, wherein
    said recognition block configured to determine the control word for each participant is configured to examine only one speech parameter and to define the control word according to linear differences of said speech parameter; and wherein the system further comprises
    said spatialization processing module further configured to control spatial positions of audio channels of the audio signal to be reproduced according to the control words.

11. The system according to claim 9, wherein said recognition block is configured to cluster the speech frames according to differences in a plurality of examined speech parameters and to determine the control word for each participant according to differences in the speech parameters of the clustered speech frames; and said spatialization processing module is configured to control spatial positions of audio channels of the audio signal to be reproduced according to the control words.

12. The system according to claim 7, wherein the examined speech parameters include at least one of the following:
the pitch of the voice;
a voicing classification of a speech frame
any LPC parameter of a speech frame.

13. A terminal device comprising:
a receiving unit configured to receive speech frames of a conference call, said speech frames including encoded speech parameters;
a decoder configured to examine at least one parameter of the received speech frames;
a recognition block configured to classify the speech frames to belong to one of a plurality of participants in said conference call, the classification being based on differences in the examined at least one speech parameter and to determine a control word for each participant according to differences in the examined at least one speech parameter; and
a spatialization processing module configured to attach control words to speech frames, the control word of each speech frame being characteristic to the participant speaking in the particular speech frame, and configured to create a three-dimensional spatialization effect to an audio signal to be reproduced by placing the participants at distinct positions in an acoustical space of the audio signal.

14. The terminal device according to claim 13, further comprising:
a stereo or a multi-channel audio reproduction system.

15. The terminal device according to claim 13, further comprising:
a display screen configured to display a speaker identification of the participant to whom the concurrent speech frames are classified to belong.

16. A computer readable medium stored with instructions, which when executed by a data processing device, performs:
receiving speech frames of a conference call, said speech frames including encoded speech parameters;
examining at least one parameter of the received speech frames;
classifying the speech frames to belong to one of a plurality of participants in said conference call, the classification being based on differences in the examined at least one speech parameter;
determining a control word for each participant according to differences in the examined at least one speech parameter;
attaching control words to speech frames, the control word of each speech frame being characteristic to the participant speaking in the particular speech frame, and
creating a three-dimensional spatialization effect to the audio signal to be reproduced by placing the participants at distinct positions in an acoustical space of the audio signal.

17. The computer readable medium according to claim 16, wherein
creating a spatialization effect is on the basis of the control words attached to speech frames.

18. A conference bridge for a teleconferencing system, the bridge comprising:

a receiving unit configured to receive speech frames of a conference call with a plurality of participants, said speech frames including encoded speech parameters;
a decoder configured to examine at least one parameter of the received speech frames; and
a recognition block configured to classify the speech frames to belong to one of the participants, the classification being based on differences in the examined at least one speech parameter and to determine a control word for each participant according to differences in the examined at least one speech parameter; and
to include information based on the speech frame classification of the participants in an audio signal for a spatialization processing of the audio signal.

19. The conference bridge according to claim 18, further comprising:
a spatialization processing module configured to create a spatialization effect to the audio signal to be transmitted to the participants by placing the participants at distinct positions in an acoustical space of the audio signal according to the control words, and
an encoder configured to encode the spatialized audio signal prior to the transmission.

20. The conference bridge according to claim 18, wherein said spatialization processing module is further configured to attach the control words into the audio signal to be transmitted as an additional control information for a further spatialization processing of the audio signal in a receiving terminal.

21. The conference bridge according to claim 20, wherein said additional control information is attached into the audio signal according to one of the following methods:
embedding the control words into the audio signal;
stealing particular bits of a speech frame of the audio signal for indicating the control word;
inserting the control words into unused control fields of a transport protocol used for transmitting the audio signal; or
transmitting the control words in a separate control signal along with the audio signal.

22. The conference bridge according to claim 18, further comprising:
said recognition block is configured to create separate audio signals, each signal representing speech of a participant;
said spatialization processing module configured to direct a speech frame of an actively speaking participant, indicated by the control word of said speech frame, to a separated audio signal of said participant;
a demultiplexer configured to generate a silent frame to the separated audio signals of other participant for the duration of said speech frame; and
a transceiver configured to transmit said separate audio signals to each of the participants.

23. A computer readable medium stored with instructions, which when executed by a data processing device, performs:
receiving speech frames of a conference call, said speech frames including encoded speech parameters;
examining at least one parameter of the received speech frames;
classifying the speech frames to belong to one of a plurality of participants in said conference call, the classification being based on differences in the examined at least one speech parameter;
determining a control word for each participant according to differences in the examined at least one speech parameter; and including information based on the speech frame classification of the participants in an audio signal for a further spatialization processing of the audio signal.

24. A terminal device comprising:

a receiving unit configured to receive speech frames of a conference call with a plurality of participants, said speech frames including encoded speech parameters;

an audio decoder configured to examine at least one parameter of the received speech frames; and a recognition block configured to classify the speech frames to belong to one of the participants, the classification being based on differences in the examined at least one speech parameter;

to include information based on the speech frame classification of the participants is configured to determine a control word for each participant according to differences in the examined at least one speech parameter; and to include information based on the speech frame classification of the participants in an audio signal for a further spatialization processing of the audio signal, wherein said terminal device operates as a master terminal connecting a plurality of slave terminals to a conference bridge.

25. The terminal device according to claim 24, further comprising:

a processing module configured to attach the control words into the audio signal to be transmitted as an additional control information for a further spatialization processing of the audio signal in slave terminals.

26. The terminal device according to claim 24, further comprising:

said recognition block is configured to separate audio signals, each signal representing speech of a participant;

a processing module is configured to direct a speech frame of an actively speaking participant, indicated by the control word of said speech frame, to a separated audio signal of said participant;

a demultiplexer configured to generate a silent frame to the separated audio signals of other participant for the duration of said speech frame; and a transmitter configured to transmit said separate audio signals to each slave terminal.

27. The terminal device according to claim 24, further comprising:

a transceiver for establishing connections to said slave terminals.

* * * * *